(No Model.)
F. A. LEWIS.
LIFTING JACK.
No. 269,435. Patented Dec. 19, 1882.
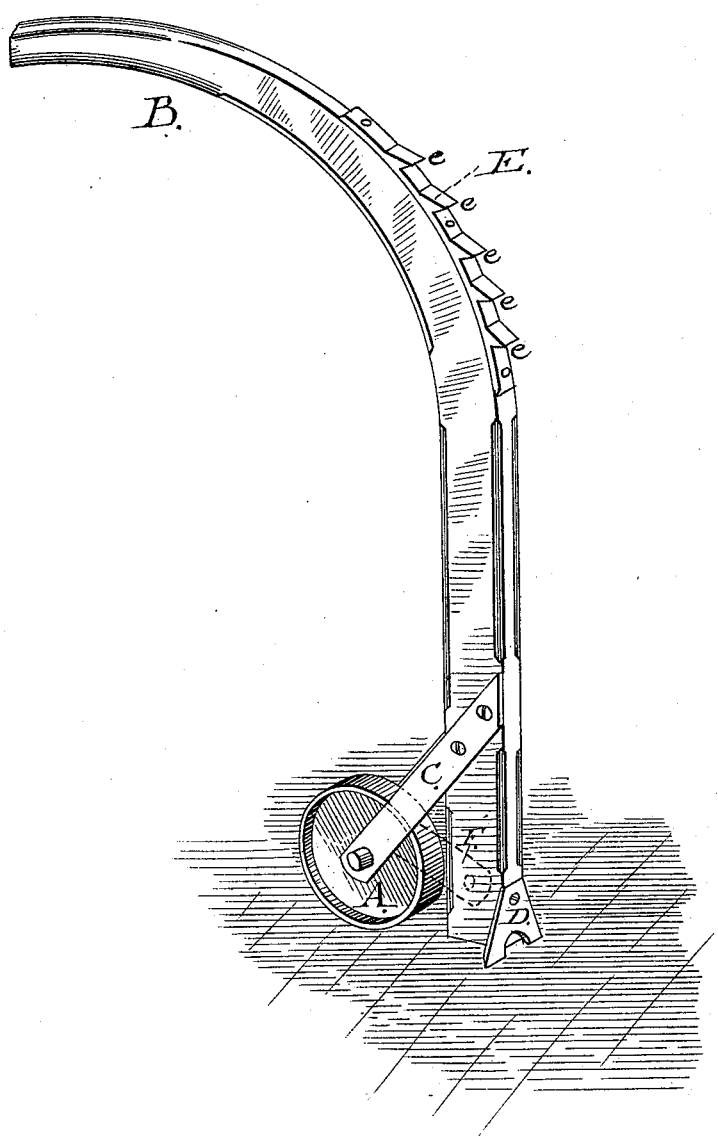
Attest;
J. Walter Fowler,
E. J. Redmond
Inventor;
Frank A. Lewis
by A. H. Evans & Co
Attys

UNITED STATES PATENT OFFICE.

FRANK A. LEWIS, OF MINNEAPOLIS, MINNESOTA.

LIFTING-JACK.

SPECIFICATION forming part of Letters Patent No. 269,435, dated December 19, 1882.

Application filed November 16, 1882. (No model.)

*To all whom it may concern:*

Be it known that I, FRANK A. LEWIS, of Minneapolis, Hennepin county, State of Minnesota, have invented certain new and useful Improvements in Lifting-Jacks, of which the following is a full, clear, and exact specification.

My invention relates to a lifting-jack for carriages and other vehicles, having a rolling and moving fulcrum, which, with a foot-piece, forms a support to the carriage axle-tree when the same is raised in order to remove the wheel or for any other purpose.

To enable others skilled in the art to make and use my invention, I proceed to describe the manner in which I have carried it out.

I am aware that jacks having a wheel at the bottom and notches at the top are not new, nor do I claim the same, broadly. My invention is a simple lever of the second class, and in its use does not tend to move the carriage or wagon forward.

In the drawing hereto annexed the figure is a perspective view of my improved jack.

A is the fulcrum-wheel; B, the curved lever; C, the side pieces; D, the foot, and E the curved tooth-rack.

In operating my device the fulcrum-wheel is placed under the carriage or wagon in such a position that one of the notches *e* shall come beneath the axle. The end of the curved lever B is then elevated, by which movement the fulcrum-wheel is brought toward the operator. When the device has assumed an upright position, as seen in the figure, the foot D will be to one side and the fulcrum-wheel A to the other side of the center of gravity, thus firmly supporting the axle and automatically remaining in position, being prevented from lateral sway by the foot D.

The device is simple and effective. By its use an axle of any height can, by one movement, be elevated in a vertical line without danger of slipping.

I do not confine myself to the precise form of construction, but may make the side pieces, C, integral with the curved lever B, in which case a brace, F, (seen in dotted lines in the figure,) will hold it firmly in position.

Having thus described my invention, what I claim as new, and desire to secure by Letters Patent of the United States, is—

1. The herein-described lifting-jack, consisting of the curved lever B, provided with the curved tooth-rack E, in combination with the wheel A, and the bearings or side pieces, C, all constructed to operate substantially as and for the purpose described.

2. The lifting-jack herein described, consisting of the curved tooth-rack E on the curved lever B, in combination with the wheel A, bearings or side pieces, C, and foot D, constructed as herein described, for the purpose specified.

FRANK A. LEWIS.

Witnesses:
FRANK B. LEWIS,
W. P. HOPKINS.